July 15, 1941.  O. GANO  2,249,688
VEGETABLE RICING MACHINE
Filed March 11, 1940   2 Sheets-Sheet 1
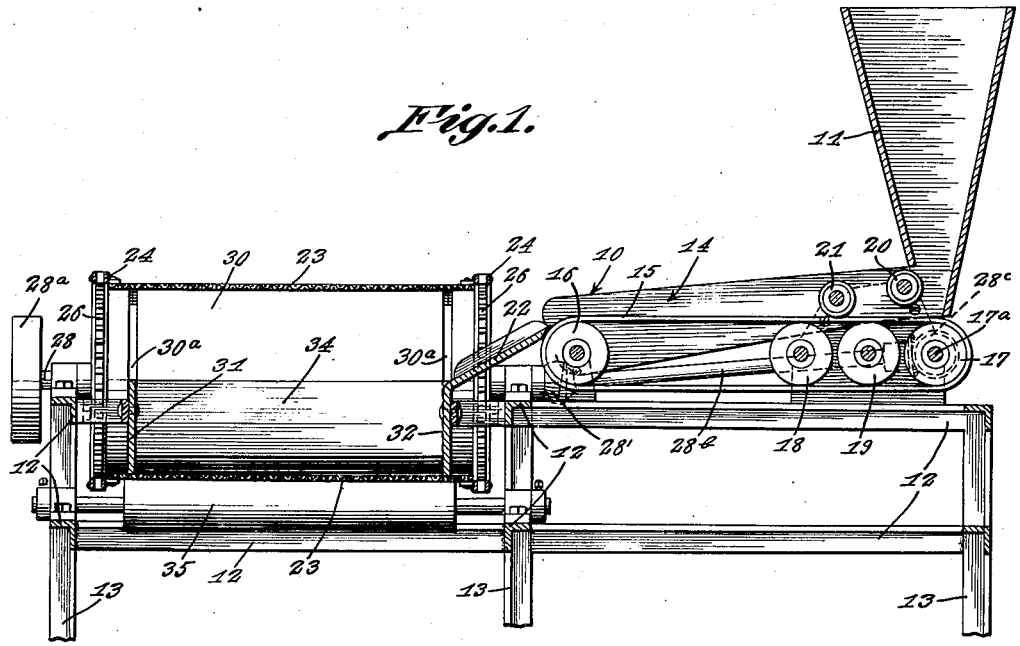
Orville Gano, INVENTOR
BY Victor J. Evans & Co.
ATTORNEYS

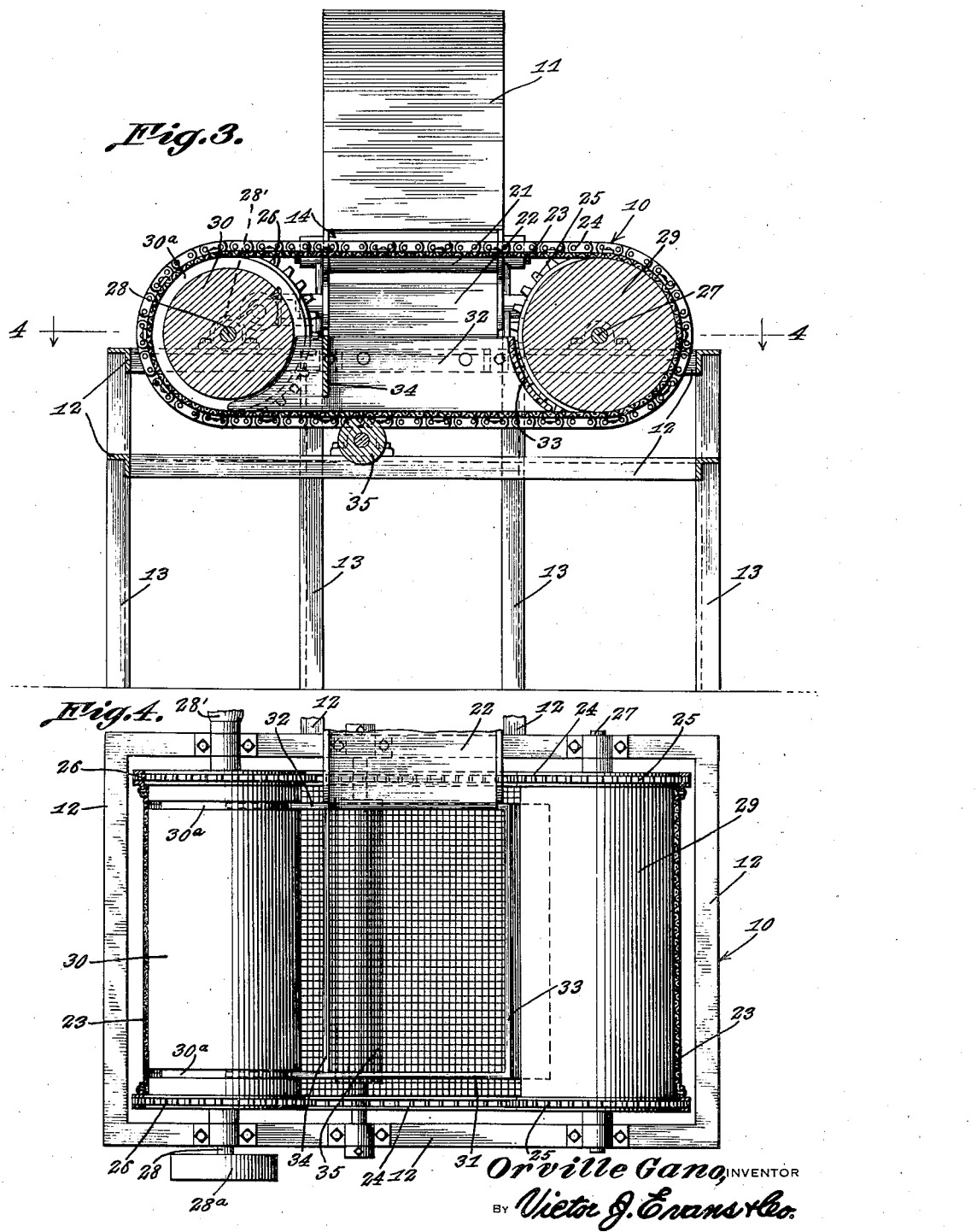

Patented July 15, 1941

2,249,688

UNITED STATES PATENT OFFICE 2,249,688

VEGETABLE RICING MACHINE

Orville Gano, Burley, Idaho

Application March 11, 1940, Serial No. 323,466

2 Claims. (Cl. 146—174)

This invention relates generally to machines useful in the treatment of vegetables such as potatoes, turnips, carrots and the like, and especially is concerned with a novel machine for expeditiously ricing vegetables of the mentioned types to yield a palatable product.

It is a primary object of the present invention to provide an apparatus which can be used in the treatment of cooked vegetables whereby light, porous, flaky product is obtained having the characteristics commonly associated with homemade riced potatoes.

An advantage of the device according to this invention over existing types of vegetable ricing machines is that the product during the course of treatment is broken up and disintegrated to an extent such that the material when discharged from the machine is soft and light, not heavy and solid as are the products obtained by using common extrusion machines.

Noteworthy among the features of the novel dicing machine according to the present invention are its simplicity and ruggedness of construction, the former suiting the device to the requirements of manufacture under conditions of mass production and the latter assuring long useful life.

Other objects, advantages and features of the new and improved vegetable dicing machine according to the present invention will be apparent to those skilled in this art during the course of the following description.

Regarded in certain of its broader aspects the novel vegetable ricing machine according to this invention comprises a supported continuous conveyor belt for receiving cooked potato and the like and rollers mounted above said belt progressively nearer thereto whereby the vegetable after passing the last roller is distributed in an essentially uniform thin layer upon the belt surface, means for removing the material from the belt and discharging the same upon the inner surface of a moving endless screen in a manner such that during the course of movement of the screen the material is pressed through the screen emerging as the riced product.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawings,

Fig. 1 is substantially a side elevational view of the presently preferred embodiment of this invention with parts broken away for clearness of illustration of internal structure, Fig. 2 is essentially a top plan view of the device shown in Fig. 1, Fig. 3 is essentially a front elevational view of the device shown in the foregoing figures with parts of the casing broken away to illustrate internal structure, and Fig. 4 is essentially a transverse sectional view taken in the plane designated by the line 4—4 in Fig. 3.

The presently preferred embodiment of this invention designated by the reference character 10 in the accompanying drawings comprises, it will be noted, a hopper 11 mounted upon a frame 12 carried on supports 13, the bottom of the hopper being open to permit delivery of vegetables placed therein onto a conveyor generally designated by the reference character 14 and comprising an endless belt 15 carried on rotating drums 16 and 17. A pair of supporting drums 18 and 19 are freely rotatably mounted to resist downward pressure applied to a portion of the belt 15 nearest the drum 17. Rollers 20 and 21 overlying the supported portion of the belt 15 are positioned with respect to the belt in a manner such that material discharged from the hopper 14 onto the belt is progressively increasingly pressed against the belt surface. In other words, the roller 20 which is located nearest the hopper 11 is spaced at a longer distance with respect to the belt 15 than is the roller 21. In this manner vegetables discharged from the hopper are partially mashed by the roller 20 and are distributed in a relatively thin film upon the belt surface by the roller 21.

A scraper 22 cooperating with the end of the conveyer 14 most distant from the hopper 11 removes material adhering to the belt 15 and causes the same to move by gravity downwardly along the scraper surface onto the under inner surface of an endless screen 23 attached to endless sprocket chains 24 carried on gears 25 and 26 which are mounted upon shafts common to and rotatable with drums 29 and 30 over which the screen pases. The drums 29 and 30 which are mounted upon shafts 27 and 28 are disposed with their axis of rotation in spaced parallelism and, viewed from the front of the device, rotate in a clockwise direction.

Partitions 31 and 32 extending between the drums 29 and 30 and receivable in grooves 30a formed in the drum 30 are provided to prevent material discharged from the inclined scraper 22 onto the screen 23 from passing over the screen edges. A first cross piece 33 attached to the partitions 31 and 32 extend circumjacent parts to the drum 29 and serves to prevent material between the partitions from adhering to the drum surface. A second cross piece 34 extending between the partitions 31 and 32 is spaced with respect to the inner under surface of the screen 23 and serves to level and limit material carried by the screen against the drum 30.

The machine is driven by an appropriate power source connected to a fly wheel 28a mounted upon the shaft 28 upon which the drum 30 is carried thus causing the drum to rotate with concomitant movement of the endless screen 23. A shaft 28b connected by a flexible coupling 28' to the shaft 28 drives the shaft 17a through the gears 28c thereby causing rotation of the drums 17 and operation of the conveyer generally designated by the reference character 14.

Having thus described the structural features of the novel vegetable ricing machine according to the present invention its preferred mode of operation now will be described and for purposes of illustration the ricing of potatoes will be described. Cooked, peeled potatoes placed in the hopper 11 descend therein by action of gravity and are carried by the moving belt 15 of the conveyer 14 against the pressing rollers 20 and 21 which flatten the potatoes and distribute the same as a film upon the belt surface which is removed by the scraper 22 causing discharge of the mashed potatoes onto the inner lower surface of the endless screen 23 upon which the potatoes are carried toward the drum 30 having been leveled by the cross piece 34. As the screen 23 travels over the drum surface the potatoes are pressed through the screen and are discharged into appropriate receiving means (not shown). It of course will be apparent to those skilled in this art that brushes, scrapers or the like can be used to facilitate removal of the riced potatoes from the screen.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A machine for ricing vegetables, comprising a frame, a pair of spaced parallel rotating rollers, one of said rollers having a peripheral groove adjacent each end, means for rotating the rollers, an endless screen passing around said rollers, means for discharging vegetables on the upper face of the lower flight of the endless conveyor between the rollers, side guard plates between the rollers adjacent the edges of the endless screen and having their ends entering the grooves in the roller, a leveler plate extending transversely between the guard plate adjacent the roller having the grooves and spaced above the screen, and a curved partition extending transversely between the guard plates adjacent the other roller.

2. A machine for ricing vegetables, comprising a frame, a pair of spaced parallel rotating rollers, one of said rollers having a peripheral groove adjacent each end, means for rotating the rollers, an endless screen passing around said rollers, means for discharging vegetables on the upper face of the lower flight of the endless screen between the rollers, side guard plates between the rollers adjacent the edges of the endless screen and having their ends entering the circumferential grooves in the roller, a leveler plate extending transversely between the guard plate adjacent the roller having the grooves and spaced from the upper face of the lower flight of the screen, a transverse curved partition between the guard plates adjacent the other roller, and a tension roller supporting the lower flight of the screen adjacent the leveler plate.

ORVILLE GANO.